United States Patent Office 3,824,251
Patented July 16, 1974

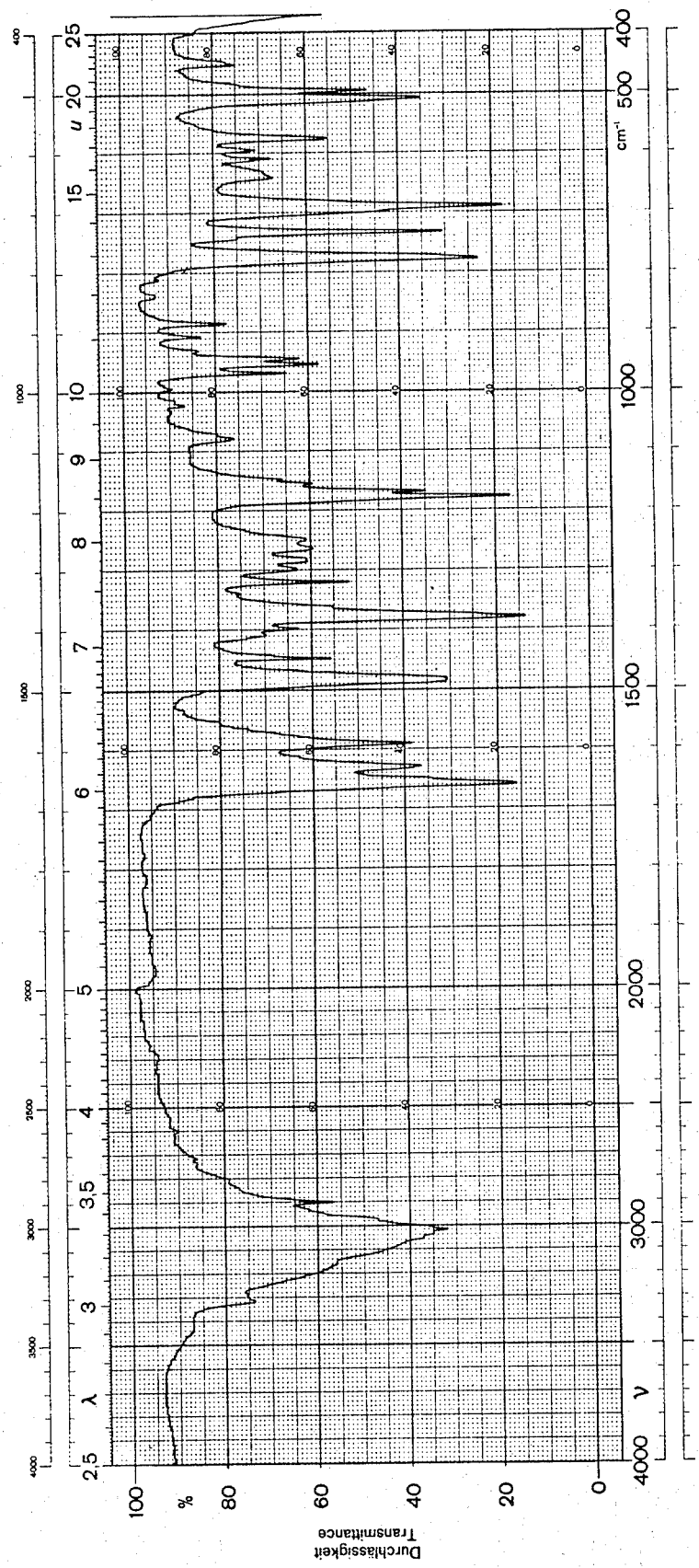

3,824,251
COMPLEX COMPOUND OF A SUBSTITUTED 3-AMINO-3-PYRAZOLIN-5-ONE AND METHODS OF PRODUCING AND FURTHER REACTING THE SAME
Hans von Castelmur, Basel, Switzerland, assignor to Solco Basel AG, Basel, Switzerland
Continuation-in-part of abandoned application Ser. No. 840,030, July 8, 1969. This application Feb. 15, 1972, Ser. No. 226,400
Claims priority, application Switzerland, July 12, 1968, 10,459/68
Int. Cl. C07d 49/16
U.S. Cl. 260—310 A 11 Claims

ABSTRACT OF THE DISCLOSURE

Complex compound of the formula

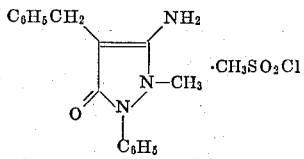

This complex compound is prepared by reacting 3-amino-4-benzyl-2-methyl-1-phenyl-3-pyrazolin-5-one (II) with methanesulfonyl chloride. Also provided is a process for preparing 4-benzyl-3-methanesulfonamido-2-methyl-1-phenyl-3-pyrazolin-5-one by reacting the complex compound with an alkaline agent. Finally, a process for preparing compound II is provided.

DESCRIPTION OF THE PRIOR ART

This application is a continuation-in-part of Ser. No. 840,030, filed July 8, 1969, now abandoned.

Acide sulphonamides having the formula

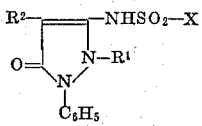

in which $R^1$ denotes lower alkyl, phenyl or benzyl, $R^2$ denotes hydrogen, lower alkyl, cycloalkyl, phenyl or benzyl and X denotes lower alkyl, phenyl, tolyl or benzyl and a process for their production are described in U.S. Pat. No. 3,087,933. The compounds, as 3-pyrazolin-5-one derivatives have analygesic and antiphlogistic properties.

In the meantime the compound having the above formula in which $R^1$ denotes methyl, $R^2$ denotes benzyl and X denotes methyl (hereinafter referred to as compound (I) has proved to be particularly interesting. The following method is proposed for its production in said patent:

(a) condensation of a benzylmalonic diester with phenylhydrazine to form 4-benzyl-1-phenylpyrazolidine-3,5-dione (yield 90%);
(b) reaction of the 1,4-disubstituted pyrazolidine-3,5-dione with phosphorus oxychloride with the formation of the corresponding 3-chloro-2-pyrazolin-5-one (yield 67.5%);
(c) methylation of the unsubstituted nitrogen atom by means of dimethyl sulfate (yield 90%); and
(d) reaction of the 4-benzyl-3-chloro-2-methyl-1-phenyl-3-pyrazolin-5-one with the potassium salt of methanesulfonic acid amide with the formation of compound I (yield 45%).

Reference is made to the theoretical possibility of a methanesulfonation of 3-amino-4-benzyl-2-methyl-1-phenyl-3-pyrazolin-5-one (II) as an alternative (not described in greater detail) for the production of compound I. Compound II is accessible according to German Pat. 747,473 by the following cumbersome method:

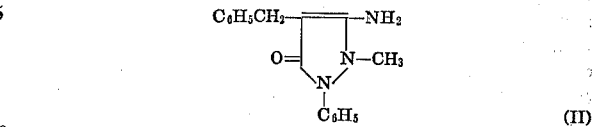

condensation of a diester of benzyloxaloacetic acid with phenylhydrazine to the (4-benzyl-5-oxo-2-pyrazolin-3)-carboxylic acid ester, methylation of the unsubstituted nitrogen atom by means of dimethyl sulfate, conversion of the pyrazolinone-3 carboxylic acid ester into the hydrazide, conversion of the hydrazide into the azide and Curtius degradation of the azide to the 3-amino derivative II.

No. 747,473 by the following cumbersome method:

The inventor named in the U.S. patent expressly renounces the practical possibility of methanesulfonation in Helv. Chim. Acta 47 (1965), 134 because "aliphatic sulfochlorides are decomposed by the tertiary amines," which permits introduction of aromatic sulfonyl radicals.

SUMMARY OF THE INVENTION

It has now been found that the reaction of the above mentioned 3-amino-4-benzyl-2-methyl-1-phenyl-3-pyrazolin-5-one (II) with methanesulfonyl chloride surprisingly results in a new complex compound of a hitherto unknown kind melting at from 135 to 136° C. with decomposition, having the formula

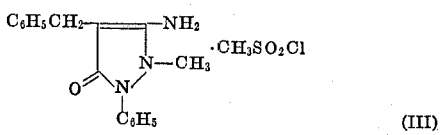

and consisting of equimolar amounts of compound II and methanesulfonyl chloride.

Unexpectedly, it has also been found that reacting the complex compound of formula III with an alkaline agent smoothly affords 4-benzyl-3-methane-sulfonamido-2-methyl-1-phenyl-3-pyrazolin-5-one (I). Hence, the methanesulfonation of compound II which has formerly been considered as not possible can be carried out very well and even with good yields when producing at first the complex compound of formula III and reacting it afterwards as disclosed above.

Still further, it has also been found that surprisingly compound II is obtained in an outstanding yield and a smooth reaction by condensation of 2-methylphenylhydrazine with the iminoether (IV) which is formed from an ester of benzylcyanoacetic acid with alcoholic hydrogen chloride or thionyl chloride and ethanol, according to the following scheme.

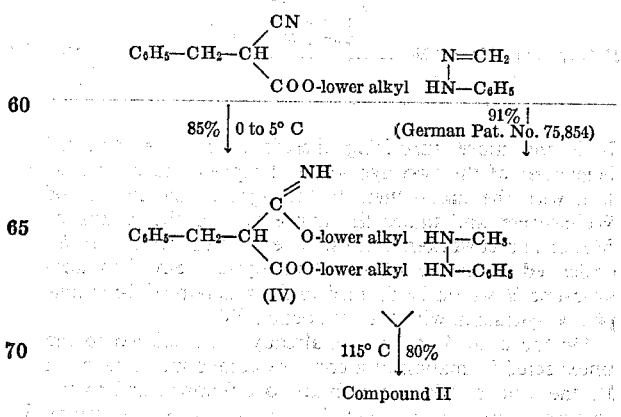

DISCUSSION OF THE INVENTION VERSUS PRIOR ART

The use of malonomonoimido ether monoester (IV) for the production of 3-amino-3-pyrazolones has already been proposed by A. Weissberger, H. D. Porter and W. Gregory (J. Amer. Chem. Soc. 66 (1944), 1851). According to U.S. Pat. No 2,376,380 however, not only arylhydrazines and heterocyclic hydrazines, but also alkylhydrazines react without any difference in that the hydrazine substituent enters into the 1-position of the 3-amino-5-pyrazolone. It could therefore not be predicted in what way 2-methyl-phenylhydrazine would react with compound IV, thus whether compound II or the isomer 3-amino-4-benzyl-1-methyl-2-phenyl-3-pyrazolin-5-one V would be formed. According to Weissberger (loc. cit.) the cyanoacetic ester reacts with phenylhydrazine to the same product as the malonomonoimidoether monoester IV, while with 2-methyl-phenylhydrazine (otherwise than the malonomonoimidoether monoester) the undesired pyrazolone V is obtained (Patent Application No. 840,031).

Absolutely classic is the manner of reaction (contrary to expectation) of 2-methyl-phenylhydrazine with acetoacetic ester. L. Knorr (A. 238 (1887), 160, 203) believed he had obtained antipyrin from 2-methylphenylhydrazine and acetoacetic acid. His erroneous finding is according to A. Müller, K. Kratzl and K. P. Berger (Monatshefte für Chemie 89 (1958), 23) "entered into the textbooks of organic chemistry as one of the proofs for the constitution of antipyrin." In fact according to Müller, Kratzl and Berger (loc. cit.) the so-called "3-antipyrin" having the formula:

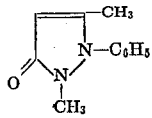

is formed in the Knorr reaction. Summarizing therefore 2-methyl-phenylhydrazine does not react in the same way as phenylhydrazine either with acetoacetic ester or with cyanoacetic ester. Table I (below) gives a synopsis of the above discussed relationship.

TABLE I.—RELATIONSHIP BETWEEN PRIOR ART AND U.S. APPLICATION SERIAL NUMBER 840,030

| Authors | Reaction components | Resulting pyrazolin-5-one derivative |
| --- | --- | --- |
| A. Weissberger et al, JACS 66 (1944), 1849. | Cyanoacetic ester plus phenylhydrazine. | 1-phenyl. |
| L. Knorr, Ber. dtsch. chem. Ges. 16 (1883), 2597. | Acetoacetic ester plus phenylhydrazine. | Do. |
| A. Weissberger et al, JACS 66 (1944), 1851. | Malonomonoimido ether monoester plus phenylhydrazine. | Do. |
| H. von Castelmur, copending appl. Ser. No. 840,031. | Cyanoacetic ester plus 2-methyl-phenyl-hydrazine. | 2-phenyl |
| L. Knorr, Annalen 238 (1887), 160, 203; A. Müller et al, Monatshefte für Chemie 89 (1958), 23. | Acetoacetic ester plus 2-methyl-phenyl-hydrazine. | Do. |
| !US. appl. Ser. No. 840,030] | Malonomonoimido ether monoester plus 2-methyl-phenylhydrazin. | [Hitherto unknown.] |

It is the more surprising therefore that the different behaviour of the two hydrazines disappears in condensation with the iminoether. In the light of the finding of Weissberger and under the impression of the results of Müller and coworkers it must have been expected that the undesired 3 - amino-4-benzyl-1-methyl-2-phenyl-3-pyrazolin-5-one V would be formed in the reaction of 2-methyl-phenylhydrazine with the iminoether IV.

On the other hand, it has already been pointed to the unexpected formation of a complex compound of formula III the kind of which was hitherto unknown, and to the smooth, as well as unexpected, conversion of said complex into 4-benzyl-3-methanesulfonamido-2-methyl-1-phenyl-3-pyrazolin-5-one (I).

Apart from the surprising course of the reaction, the synthesis of compound I via the base II by the iminoether method is accompanied by a substantial technical advance:

(1) Starting from the compound to be condensed with the hydrazine (i.e. benzylcyanoacetic ester, respectively benzylmalonic diester), the new process comprises three stages instead of the four stages according to U.S. Pat. No. 3,087,933. The remaining stages are less laborious than the equivalent stages in the prior art method. The total expenditure of labour is less than in the prior art method by a factor of about 3;

(2) the total yield is exactly doubled as compared with the state of the art; according to U.S. patent it is 27.3% and by the process according to this invention it is 54.5%;

(3) the starting product 2-methyl-phenylhydrazine is more easily accessible than the potassium salt of methanesulfonic acid amide required in the prior art synthesis;

(4) the new process is much less exacting as regards apparatus and as regard reaction conditions than the process according to U.S. Pat. No. 3,087,933; in particular the need to use corrosion-resistant pressure vessels is dispensed with and the maximal reaction temperature is 115° C., whereas according to the prior art 215° C. is necessary.

DETAILED DESCRIPTION OF THE INVENTION

The conversion of the benzylcyanoacetic ester into the corresponding iminoether hydrochloride in order to obtain the starting material (IV), preferably takes place in the same alcohol as that with which the substituted acetic acid has been esterified, for example in ethanol in the case of ethyl acetate; it is carried out by means of thionyl chloride or hydrogen chloride gas under anhydrous conditions and at a temperature of about 0° C. The yield can be increased by allowing the reaction mixture to stand for a long period, for example ten days, at a temperature of from 0° to 5° C. The iminoether hydrochloride is unstable even in crystallized form and is therefore immediately used for the next stage of the process.

Condensation of the iminoether hydrochloride with the hydrazine derivative should be carried out under anhydrous conditions and while excluding oxygen. The reaction is advantageously carried out in the presence of an agent for binding acid (tertiary organic amines being particularly well suited to the purpose) while stirring and at first at a temperature of about 0° C.; the temperature is then allowed to rise slowly and heating at about 110° C. while stirring is carried out after some hours. 2-methylphenylhydrazine is fairly sensitive to atmospheric oxygen, carbon dioxide and moisture in the form of the free base and it is therefore advantageously stored in the form of its salt, for example as hydrochloride; if it is used in the reaction as a salt, an acid for binding acid has to be added in at least a stoichiometric amount. For working up, the reaction mixture is advantageously made alkaline, volatile substances are removed by evaporation and the compound II is isolated by decanting and filtering.

3 - amino-4-benzyl-2-methyl-1-phenyl-3-pyrazolin-5-one II surprisingly forms with methanesulfonyl chloride in equimolar proportions a complex which melts with decomposition at from 135° to 136° C., which is sparingly soluble in conventional inert solvents and in other respects has the typical property of molecular compounds of being dissociatable into its components. In particular it dissociates in aqueous suspension with the formation of methanesulfonyl acid, hydrochloric acid and the compound II; even after fifteen minutes the chlorine can be comprehended argentometrically as chloride to the extent of 100%. Alkalisation of the aqueous suspension and filtering off gives a filter residue which according to melting point, mixed melting point and thin film chromatogram consists of the pure compound II and whose weight makes up about 65% of the weight portion (theory 70% of the weighed portion).

The complex formation is carried out by mixing together 3-amino-4-benzyl-2-methyl-1-phenyl-3-pyrazolin-5-one and methanesulfonyl chloride, preferably in an inert diluent or solvent, and allowing the two compounds to react for some time, for example several hours. The inert diluent or solvent may be for instance a halogenated hydrocarbon, such as methylene chloride, methylene bromide, methylene iodide, chloroform, 1,1-dichloro ethane, 1,2-dichloro ethane, 1,2-dibromo ethane, 1,2-dichloro ethylene, 1,1,2-trichloro ethylene, chlorobenzene, o-dichlorobenzene, bromobenzene and the like. Preferred solvents are methylene chloride, methylene bromide and chloroform.

The complex formation does not necessarily require the presence of a solvent or diluent as was found by liquifying a mixture of 3-amino-4-benzyl-2-methyl-1-phenyl-3-pyrazolin-5-one and excess methane sulfonyl chloride, keeping the mixture for about 15 minutes at room temperature and reacting it with e.g. 20% aqueous natrium hydroxide solution, whereby the 3-methanesulfonamido derivative is obtained. However, working with a inert solvent or diluent such as a halogenated hydrocarbon is advantageous for operative reasons.

The subsequent sulfonamide formation is carried out by treating the complex compound III with an alkaline agent, the choice of the reaction conditions being limited to those which leave the methanesulfonyl chloride intact; alkali metal hydroxides or carbonates or caustic alkali in the solid state or in solution are suitable. The reaction starts when the alkaline agent is added and proceeds strongly exothermally. When the reaction conditions described and set out more exactly in the Examples are maintained, yields as high as about 85% of the theory are obtained. Isolation of the end product may be carried out by adding water, separating and acidifying the aqueous-alkaline phase and filtering off the deposited product. Unreacted 3-amino-3-pyrazolin-5-one can be recovered by evaporating the dried organic phase. The compound forms crystallised salts soluble in water with alkalies, for example caustic soda solution, caustic potash solution and the like.

IDENTIFICATION OF THE COMPLEX COMPOUND

The word complex means some sort of addition compound able to dissociate with formation of the starting materials, i.e. compound II and methanesulfonyl chloride, or their decomposition products.

The complex is obtained as a crystallized substance having the elementary composition $C_{18}H_{20}N_3O_3SCl$ regardless of the relative amounts of the starting materials originally present. Said composition exactly corresponds to the sum of one mole each of the starting materials ($C_{17}H_{17}N_3O$; $CH_3SO_2Cl$). A mixture of equal amounts of the complex and of compound II melts with considerable depression at 123 to 126° C.

Compound II forms orthorhombic or pseudorhombic monocrystals which, optically, are biaxially negative with an axial angle of 80 to 85°. Contrary to that, the complex (III) consists of monoclinic or triclinic tabular crystals, mostly grown together to form aggregates which are crystallographically non-delimited. Optically, the monocrystals are also biaxially negative, but their axial angles are of only 35 to 40°. This difference suggests that the two substances are not identical.

The lines of the X-ray spectrum of the two substances differ in their spacing (e-value) and in intensity (I-value), both of which can only be explained by the existence of a structure difference. Since there are no identical e-values, it must also be admitted that compound III is not a mixture of compound II and methanesulfonyl chloride, but a new compound.

The IR-spectrum of the complex is attached herewith.

The rate of formation of the complex depends on the temperature and is enhanced by a slight excess of methanesulfonyl chloride:

at 0° C.—no reaction, i.e. no precipitate after two hours, and no formation of compound I after subsequent addition of caustic alkali;

at 25° C.—reaction complete after 3 to 5 hours, yield of compound III more than 90% of the theory;

at 40° C.—reaction complete after 0.5 to 1 hour, yield of compound III also above 90% of the theory.

The rate of decomposition of the complex in water depends on the temperature. A stirred suspension of 12 g. of the complex in 100 ml. of water at 20° C. turns very slowly acid; after about 0.5 hour the pH is still around 5 and another half hour later it is about 4.5. The pH immediately drops to a value of about 1 upon heating the suspension to 85° C.; decomposition was shown to be complete after 5 minutes at 100° C. The decomposition products have been identified as hydrogen chloride and compound II, each of which being obtained in an amount corresponding to one equivalent per mole of complex.

In order to further confirm the assigned structure, the reaction of the complex (5 g.) with excess aniline (50 ml.) has been investigated and shown to result in compound II and methanesulfonic acid anilide in nearly quantitative yield (90.4%, respectively almost 100% of the theory). The reaction takes place according to the following scheme:

Compound III           Compound II

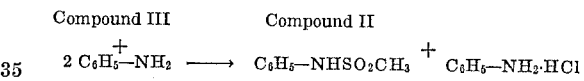

$$2\ C_6H_5\text{—}NH_2 \longrightarrow C_6H_5\text{—}NHSO_2CH_3 + C_6H_5\text{—}NH_2\cdot HCl$$

By merely mixing together the starting materials while stirring, an exothermic reaction sets in after which the temperature is raised and held at 80° C. for 30 minutes. After elimination of excess aniline and aniline-hydrochloride, the oily residue (4.7 g.) is dissolved in 25 ml. hot methanol. Addition of 10 ml. 10% aqueous NaOH to the solution causes compound II (3.2 g.) to crystallize; upon filtration and addition of 2 ml. glacial acetic acid to the mother liquor, the anilide (2.2 g.) is obtained in crystallized state. The identification has been carried out by comparison with synthetic products.

The invention is illustrated by the following Examples.

Example 1

(a) 40.5 g. (0.2 mole) of distilled ethyl benzylcyanoacetate and 18.4 g. (0.4 mole) of absolute ethanol are placed in a dry apparatus while excluding moisture and gassing with nitrogen and the solution is cooled to 0° C. while stirring. 23.8 g. (0.2 mole) of freshly distilled thionyl chloride is allowed to drip in within two hours while maintaining a temperature which does not rise above 5° C. A clear, yellowish and viscous solution is formed which is allowed to stand for ten days at 0° to 5° C.; during this period sulfur dioxide escapes and the hydrochloride of 2-ethoxycarbonyl-3-phenyl propionic acid-(O-ethylimidate) forms practically quantitatively.

The hydrochloride crystallises spontaneously or after seeding. To bring the deposited product into a form in which it can be filtered better, absolute ether is added to it, filtration is carried out while excluding moisture, it is washed with absolute ether and dried under anhydrous conditions in vacuo. The salt melts at from 85° to 86° C. (with decomposition). Since even the crystallised compound is unstable, it should be used as soon as possible.

(b) If the hydrochloride obtained has remained in the liquid condition, 57.2 g. (0.2 mole) thereof is added slowly while stirring and gassing with nitrogen at a temperature of from 0° to 5° C. to a mixture of 24.4 g. (0.2 mole) of distilled 2-methylphenylhydrazine and 50 ml. of pyridine. If the hydrochloride has solidified however it is left in the reaction flask already used and it is covered with the cooled mixture of 2-methylphenylhydrazine and pyridine (24.4 g. and 50 ml.); slow solution of the crystallised material is effected by passing through nitrogen. The reaction proceeds exothermally and care has to be taken in both cases that the internal temperature does not exceed 5° C. up to the end of the solution process.

The temperature is then allowed to rise to 20° C. while stirring, the whole is stirred for another four hours and the reaction mixture is heated for six hours at 115° C. while stirring, and then allowed to cool. The base is set free from the pyridine hydrocholride formed by adding alkali, evaporation is carried out on a rotary evaporator under a pressure of 19 torr until a pasty consistency has been formed, 50 ml. of water is added to the residue and evaporation is again carried out to a pasty consistency. The residue is taken up in 100 ml. of hot 96% ethanol, about 15 ml. of ethanl is allowed to evaporate and the whole is slowly cooled to room tempertaure so that the compound separates in the form of large beautiful crystals. They are filtered off after some hours, washed with a little ethanol and dried in vacuo at 40 to 60° C. to remove adherent solvent and subsequently at 90° C. to remove 1 mole of bound ethanol. The 3-amino-4-benzyl-2-methyl-1-phenyl-3-pyrazolin-5-one melts at 100° C. when still containing 1 mol of ethanol per mole of the base and at 134 to 136° C. after drying, or at 139° C. after repeated recrystallisation from ethanol and drying at 40 to 60° C. and subsequently at 90° C. Another small portion of the compound is obtained by concentration of the mother liquor. Yield 42 g. of (about 75% of the theory).

(c) 300 ml. of 20% caustic soda soltuion and 700 ml. of water are placed in a flask ask provided with stirring means and distillation equipment, heated to about 65° C. and at the same temperature within one hour with vigorous stirring a solution of 56 g. of 3-aminopyrazolinone of melting point 134 to 136° C. (0.2 mole), 200 ml. of methylene chloride and 70 g (0.6 mole) of methanesulfonyl chloride is dripped in. It is advantageous to allow the solution to flow in in three successive portions, each thereof having aged for twenty minutes and being then dripped in within the next twenty minutes. The heat produced by the slightly exothermic reaction is largely consumed by evaporation of the methylene cholride. After stirring for another hour, the methylene chloride free solution is filtered while hot and the filter residue consisting of unreacted 3-aminopyrazolinone (22 g., 40% of the mixture) is washed with a little alkalised water.

Ice is added in such an amount to the filtrate that the temperature is brought to 0° C. and kept at that temperature, and the amount of glacial acetic acid to set up a pH value of from 4 to 5 is added all at once. A very fine voluminous precipitate is formed which can readily be filtered if filtration takes place without delay. It is washed with ice-cold water and dried in vacuo at 60° C.; the yield is 60%. The 4 - benzyl-3-methanesulfonamido-2-methyl-1-phenyl-3-pyrazolin-5-one melts at 197° to 198° C. after it has been dissolved in dilute caustic soda solution, precipitated with acetic acid and dried.

Analysis: $C_{18}H_{19}N_3O_3S$—molecular weight 357.4
calculated: C, 60.49%; H, 5.36%; N, 11.76%
found: C, 60.63%; H, 5.47%; N, 11.66%.

The compound is in the form of a white, fine crystalline, bitter tasting powder; it is practically insoluble in isopropanol or benzene, very sparingly soluble in water, moderately soluble in methanol, ethanol, ethyl acetate or acetone but readily soluble in 0.1-normal caustic soda solution with the formation of the sodium salt.

Example 2

(a) 40.6 g. (0.2 mole) of distilled ethyl benzylcyanoacetate, 9.2 g. (0.2 mole) of absolute ethanol and 40.0 g. of absolute ether are placed in a dry apparatus. The mixture is cooled while stirring to 0° C. and while maintaining a temperature not rising above 5° C. about 8.8 g. (about 0.24 mole) of hydrogen chloride gas is passed in; a clear solution is formed which is allowed to stand for ten days at from 0° to 5° C. and which deposits crystals during this period. The yield of hydrochloride of 2-ethoxycarbonyl-3-phenylpropionic acid-(O-ethylimidate) is practically quantitative. The compound is preferably immediately worked up without further purification.

The reaction time is considerably reduced if the amount of hydrogen chloride added is doubled. Also, raising the reaction temperature up to the limit of beginning decomposition of the O-ethylimidate (indicated by begining precipitation of ammonium chloride) enhances the reaction rate.

(b) The reaction of the iminoether hydrochloride with 2-methylphenylhydrazine is carried out by the same method as is described in Example 1(b).

(c) 14 g. (about 0.05 mole) of 3-amino-4-benzyl-2-methyl-1-phenyl-3-pyrazolin-5-one is dissolved in 100 ml. of methylene chloride and at room temperature while stirring 12 ml. (about 0.16 moles) of methanesulfonyl chloride is added. After stirring at room temperature for fifteen to twenty minutes, there begins the separation of a product from the solution. The whole is stirred for another fifteen hours and then 20 g. of finely ground sodium hydroxide is slowly added in small portions, the reaction thus soon proceeding exothermally. The reaction mixture is kept under reflux (41° to 42° C.) for two hours, 50 ml. of water is cautiously added and a clear two-phase system is thus obtained which is separated in a separating funnel. The methylene chloride phase is washed with water and the aqueous-alkaline phase is washed with methylene chloride. By evaporating the combined and dried methylene chloride phases on a rotary evaporator, 3 g. of unreacted 3-aminopyrazolinone (about 20% of the mixture) is recovered.

The aqueous-alkaline solutions are combined, cooled to 0° C. with ice and adjusted to a pH value of 4 to 5 by adding about 10 ml. of glacial acetic acid while stirring vigorously. A white product is immediately precipitated which, after allowing to stand for ten minutes at 0° C., is filtered off, washed twice, each time with 10 ml. of ice-water and dried in a drying cabinet at 60° C. in vacuo. 14 g. (about 80% of the theory) of crude 4-benzyl-3-methanesulfonamido - 2 - methyl - 1 - phenyl-3-pyrazolin-5-one having a melting point of 188° to 194° C. is obtained. Further purification is carried out as already described in Example 1(c) and gives a product of the same quality.

Example 3

Isolation of the complex (molecular compound):

14 g. (0.05 mole) of 3-amino-4-benzyl-2-methyl-1-phenyl-3-pyrazolin-5-one is dissolved in 50 ml. of methylene chloride, 17.5 g. of methanesulphonyl chloride (0.15 mole) is added, the whole is stirred for twenty-four hours at room temperature, kept for five hours at 0° C., beautiful crystals formed are filtered off and washed with a little ice-cold methylene chloride and dried in vacuo at room temperature. 16 g. (80% of the theory) of the molecular compound is obtained having a melting point of 135° to 136° C. with decomposition; empirical formula: $C_{18}H_{20}N_3O_3SCl$.

Example 4

Isolation of the complex (molecular compound):

14 g. (0.05 mole) of 3-amino-4-benzyl-2-methyl-1-phenyl-3-pyrazolin-5-one is dissolved in 50 ml. of methylene chloride at a temperature of about 35° C., the resulting clear, slightly yellowish solution is cooled to about 25° C., 6.9 g. (0.06 mole) of methanesulfonyl chloride is added at once and the clear, yellowish solution is allowed to stand for two days at 15 to 18° C. The crystals formed are filtered off, suspended in a little ice-cold methylene chloride, filtered off again, washed with a little ice-cold methylene chloride and dried in vacuo at 50° C. 15 g. (76.2% of the theory) of the complex compound is obtained having a melting point of 135 to 136° C. with decomposition.

By allowing the mother liquor to stand for 15 hours at −15° C. another portion of crystallized material is obtained which after isolation and purification as described above yields further 4.2 g. (21.3% of the theory) of complex compound of same melting point. The whole yield amounts to 19.2 g. or 97.5% of the theory.

The spectral and crystallographic data mentioned in the introductory part have been obtained from material produced according to this example.

Example 5

Reaction of the complex with alkali:

14 g. (0.05 mole) of 3-amino-4-benzyl-2-methyl-1-phenyl-3-pyrazolin-5-one is dissolved in 50 ml. of methylene chloride at about 35° C., the resulting solution is cooled to 25° C., 6.9 g. (0.06 mole) of methanesulfonyl chloride is added at once and the clear, yellowish solution is kept under occasional shaking or stirring for four hours at 25° C. After this time there is obtained either a superstaturated solution or a suspension of the complex. The solution or suspension is slowly poured on 300 ml. of a vigorously stirred cold (0° C.) 5% aqueous caustic soda solution and the mixture is stirred for three hours while the temperature is allowed to rise up to room temperature. The aqueous phase is separated, filtered, cooled to 0° C. and brought to pH 4 to 5 by addition of glacial acetic acid. A voluminous, crystalline precipitate is formed which is filtered off, washed with ice-cold water and dried in vacuo at 60° C. There is obtained 17.5 g. (85% of the theory) of crude 4-benzyl-3-methanesulfonamido-2-methyl-1-phenyl-3-pyrazolin-5-one having a melting point of 190 to 195° C. Further purification may be carried out as described in Example 1(c) above. The unreacted 3-amino-4-benzyl-2-methyl-1-phenyl-3-pyrazolin-5-one is recovered in substantially quantitative yield from the methylene chloride phase.

The 5% caustic soda solution may be replaced by half the volume of 10% solution. In both cases, sodium hydroxide may be replaced by potassium hydroxide. The alkali metal carbonates are less effective and the corresponding bicarbonates are ineffective. It should be noted that caustic soda and caustic potash solution may be replaced by solid powdered caustic soda or caustic potash (see Example 2). In the latter mode of carrying out the method, however, the highly exothermic reaction may easily go out of control.

Interestingly, adding a freshly prepared cold (0° C.) solution of 3-amino-4-benzyl-2-methyl-1-phenyl-3-pyrazolin-5-one and methanesulfonyl chloride in methylene chloride to a cold (0° C.) 5% aqueous caustic soda solution does not yield more than traces of the 3-methane-sufonamido derivative (obviously, because the complex formation has had not enough time to take place).

Example 6

Reaction of the complex with alkali:

The complex as formed according to Example 3 or Example 4 is isolated by filtration and added batchwise to a cold (0° C.) vigorously stirred 5% aqueous sodium hydroxide solution, the pH being kept above 10. The reaction mixture is allowed to warm up to room temperature while stirring, filtered, and the filtrate is treated in accordance with the isolation procedure described in Examples 1 and 2.

From 19.7 g. (0.05 mole) of the complex there is obtained 15 g. (84% of the theory) of crude 4-benzyl-3-methanesulfonamido-2-methyl-1-phenyl-3-pyrazolin-5-one melting at 190 to 195° C. 2.1 g. (15% of the theory with respect to the amount originally present in the complex) of unreacted 3-amino-4-benzyl-2-methyl-1-phenyl-3-pyrazolin-5-one is recovered from the filter.

Example 7

Sodium salt of 4-benzyl-3-methanesulfonamido-2-methyl-1-phenyl-3-pyrazolin-5-one:

1 litre of 10-normal caustic soda solution is added to 350 g. of the compound; the reaction proceeds exothermally and the temperature of the reaction mixture rises to about 70° C. At a pH value of 8.5 to 9 complete solution takes place and the solution is filtered. After a short time crystallisation starts and the whole is allowed to stand for four hours. Filtration then takes place, the crystalline filter residue is washed with cold distilled water and dried in vacuum at room temperature. The yield is 300 g.; another about 30 to 35 g. crystallises from the filtrate. The dried sodium salt contains 2 moles of water of crystallisation.

$C_{18}H_{18}N_3O_3SNa.2H_2O$
   molecular weight: 415.4
   anhydrous: 389.4.

Analysis:

| | Percent |
|---|---|
| $C_{18}H_{18}N_3O_3SNa$ | 91.3 |
| $H_2O$ | 8.65 |

Elementary analysis:
   calculated: C, 52.03%; H, 5.34%; N, 10.12%; Na, 5.54%
   found: C, 52.05%; H, 5.34%; N, 10.10%; Na, 5.54% ultraviolet spectrum in 0.1-normal caustic soda solution: $\epsilon = 1.7 \times 10^4$

What I claim is:

1. A complex compound of the formula

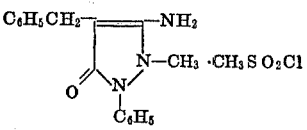

2. A method for the production of the complex compound according to claim 1, which consists essentially of condensing a compound of the formula

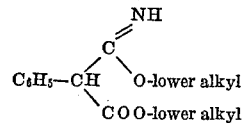

with 2-methyl-phenylhydrazine and reacting the 3-amino-4-benzyl-2-methyl-1-phenyl-3-pyrazolin-5-one thus obtained with methanesulfonyl chloride in an inert diluent or solvent.

3. A method for the production of the complex compound according to claim 1, which consists essentially of contacting the hydrochloride of a compound of the formula

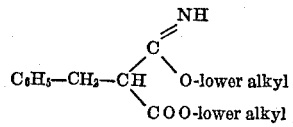

in the presence of an acid-binding agent in an oxygen-free atmosphere under anhydrous conditions with 2-methyl-phenyl-hydrazine at a temperature of about 0° C., allowing the temperature to rise slowly, subsequently heating the mixture at about 110° C. and reacting the resultant compound with methanesulfonyl chloride in an inert diluent or solvent.

4. A method for the production of the complex compound according to claim 1, which consists essentially of reacting 3-amino-4-benzyl-2-methyl-1-phenyl-3-pyrazolin-5-one with methanesulfonyl chloride in an inert diluent or solvent.

5. The method according to claim 3, wherein the acid-binding agent is a tertiary organic amine.

6. The method according to claim 2, wherein the inert diluent or solvent is a halogenated hydrocarbon.

7. The method according to claim 2, wherein 3-amino-4-benzyl-2-methyl-1-phenyl-3-pyrazolin-5-one and methane sulfonyl chloride are allowed to react together at a temperature between 0° C. and the boiling point of the diluent or solvent used for a time permitting substantial completion of the reaction.

8. The method according to claim 4, wherein the inert diluent or solvent is a halogenated hydrocarbon.

9. The method according to claim 4, wherein 3-amino-4-benzyl-2-methyl-1-phenyl-3-pyrazolin-5-one and methanesulfonyl chloride are allowed to react at a temperature between 0° C. and the boiling point of the diluent or solvent used for a time permitting substantial completion of the reaction.

10. A method for the production of a compound of the formula

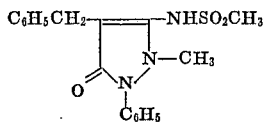

or its alkali metal salt, which comprises reacting the complex compound according to claim 1 with an alkaline agent and optionally reacting the compound thus obtained with an alkali to produce the alkali metal salt.

11. The method according to claim 10, wherein an alkali metal hydroxide, alkali metal carbonate or caustic alkali is used in the solid state or in solution as the alkaline agent.

References Cited

UNITED STATES PATENTS 3,087,933  4/1963  Matter et al. _____ 260—310
3,119,830  1/1964  Burt _____ 260—556 A

OTHER REFERENCES

JACS 66: 1851–1855 (1944), Weissberger et al.

HENRY R. JILES, Primary Examiner

S. D. WINTERS, Assistant Examiner

U.S. Cl. X.R.

260—311, 310 B, 465 D, 471 R, 569; 424—273